US010287908B2

(12) United States Patent
Hiernaux

(10) Patent No.: US 10,287,908 B2
(45) Date of Patent: May 14, 2019

(54) VARIABLE ORIENTATION VANE FOR COMPRESSOR OF AXIAL TURBOMACHINE

(71) Applicant: Safran Aero Boosters SA, Herstal (Milmort) (BE)

(72) Inventor: Stephane Hiernaux, Oupeye (BE)

(73) Assignee: Safran Aero Boosters SA (BE)

( * ) Notice: Subject to any disclaimer, the term of this patent is extended or adjusted under 35 U.S.C. 154(b) by 192 days.

(21) Appl. No.: 15/650,558

(22) Filed: Jul. 14, 2017

(65) Prior Publication Data

US 2018/0045070 A1 Feb. 15, 2018

(30) Foreign Application Priority Data

Aug. 12, 2016 (BE) .................... 2016/5635

(51) Int. Cl.
| F01D 17/16 | (2006.01) |
| F01D 9/04 | (2006.01) |
| F04D 29/32 | (2006.01) |
| F04D 29/36 | (2006.01) |
| F04D 29/56 | (2006.01) |

(52) U.S. Cl.
CPC .......... *F01D 17/162* (2013.01); *F01D 9/041* (2013.01); *F04D 29/323* (2013.01); *F04D 29/362* (2013.01); *F04D 29/563* (2013.01); *F05D 2220/3216* (2013.01); *F05D 2240/12* (2013.01); *F05D 2260/404* (2013.01); *Y02T 50/671* (2013.01)

(58) Field of Classification Search
CPC ...... F01D 17/162; F01D 9/041; F04D 29/563; F04D 29/323; F04D 29/362; Y02T 50/671; F05D 2260/404; F05D 2240/12; F05D 2220/3216
See application file for complete search history.

(56) References Cited

U.S. PATENT DOCUMENTS 3,678,306 A * 7/1972 Garnier ..................... F02C 7/04
310/11
5,595,474 A * 1/1997 Girard ..................... B64C 11/44
416/1

(Continued)

FOREIGN PATENT DOCUMENTS

GB        2294094 A    4/1996
WO    2014205816 A1   12/2014

OTHER PUBLICATIONS

European Search Report from corresponding Belgium Application No. BE 201605635, dated Apr. 5, 2017.

*Primary Examiner* — Hung Q Nguyen
(74) *Attorney, Agent, or Firm* — Sandberg Phoenix & von Gontard P.C.

(57) ABSTRACT

A system for controlling a variable orientation vane of a turbomachine compressor, for example a low-pressure compressor of a turbojet engine. Such a vane is also known as a variable stator vane. The system comprises a support, an orientable vane that is movable in rotation relative to the support and that comprises a lever for controlling the orientation of the orientable vane (26), and a magnetic field source that defines an air gap with the lever. When the source is powered electrically, it forms an electromagnet attracting the lever by induction such that the orientable vane changes orientation.

20 Claims, 4 Drawing Sheets

(56) References Cited

U.S. PATENT DOCUMENTS

| | | | |
|---|---|---|---|
| 7,491,030 B1* | 2/2009 | Pinera | F01D 5/147 415/161 |
| 2006/0091731 A1* | 5/2006 | Haje | F01D 15/10 310/11 |
| 2010/0166540 A1 | 7/2010 | Perez et al. | |
| 2013/0084179 A1* | 4/2013 | Mantese | F01D 17/162 416/1 |
| 2014/0286745 A1* | 9/2014 | Rusovici | F01D 17/162 415/1 |
| 2016/0010486 A1* | 1/2016 | Christians | F01D 17/162 415/1 |
| 2016/0138415 A1 | 5/2016 | Poisson et al. | |

* cited by examiner ial turbomachine, in particular an aircraft turbojet or turbopropilization setting of a variable orientation vane for compressor of axial turbomachine.

VARIABLE ORIENTATION VANE FOR COMPRESSOR OF AXIAL TURBOMACHINE

CROSS-REFERENCE TO RELATED APPLICATIONS

This application claims the benefit, under 35 U.S.C. § 119 of BE 2016/5635 filed Aug. 12, 2016, the disclosure of which is incorporated herein by reference in its entirety.

FIELD

The invention relates to variable stator vanes. The invention concerns a reduction in mechanical play in a system of variable stator vanes. The invention also concerns an axial turbomachine, in particular an aircraft turbojet or turboprop engine, equipped with variable stator vanes.

BACKGROUND

It is known to provide several rows of vanes which are orientable relative to the housing of the turbojet compressor. Such vanes may be pivoted during operation of the engine. Their arched airfoil swivel relative to the primary flow which they cross, which allows their action to be adapted according to the engine speed and flight conditions. The operating range is thus extended.

These vanes are equipped with control rods mounted so as to pivot in openings through the external casing of the compressor. The free ends of the control rods are extended laterally by control levers which are themselves connected to a control ring. Actuators allow the rings to be driven in rotation to incline the levers and hence orient the vanes. The actuators may be controlled as a function of sensors or of different operating parameters of the turbomachine.

The performance of the compressor depends on the precision of angular positioning of the vanes relative to the casing. To this end, the coupling between the control rod and the lever of a vane must be precise as well as having to tolerate significant torque levels. The installation setting of the orientation between the control shaft and the lever must be particularly precise.

Document US2010/0166540 A1 discloses a turbomachine for an aircraft equipped with a compressor section. The compression section comprises several rotor vanes and several stator vanes arranged upstream of the rotor vanes. The compression section comprises a variable geometry thanks to the presence of pivoting stator vanes, which allows modification of the pressure and speed of the fluid supplied to the rotor vanes. The pivoting vanes each comprise a journal extended by a control lever. These control levers are connected to a common actuating ring which allows the assembly of the row of pivoting vanes to be controlled by simple rotation of the actuator ring. Also, each lever has a pincer form engaged with the associated vane, which limits the mechanical play harmful to the accuracy of control. However, mechanical play persists at the control ring. Also, the rotation of the latter causes a flexion of the levers and hence internal stresses in the levers.

Document WO2014/205816A1 discloses a control system for variable stator vanes for a turbomachine. Magnetic field sources actuate the vanes into different orientations.

SUMMARY

The aim of the invention is to solve at least one of the problems posed by the prior art. More particularly, the aim of the invention is to improve the accuracy of control of a variable stator vane. Another aim of the invention is to propose a system for controlling variable stator vanes, reducing the play while limiting the internal stresses. A further aim of the invention is to propose a solution which is simple, resistant, lightweight, economic, reliable, easy to produce, simple to maintain and simple to inspect, and which improves efficiency.

The object of the invention is a control system for controlling a variable orientation vane of a turbomachine, the control system comprising: a support; a vane that is movable in rotation relative to the support and that comprises a lever for controlling the orientation of the vane; distinguished in that it also comprises an actuator with a magnetic field source which defines an air gap with the control lever so as to be able to drive the control lever in rotation.

According to various advantageous embodiments of the invention, the magnetic field source comprises a coil and where applicable a ferromagnetic core inside the coil.

According to various advantageous embodiments of the invention, the lever comprises a portion of ferromagnetic material cooperating with the magnetic field source.

According to various advantageous embodiments of the invention, the lever comprises an additional thickness cooperating with the magnetic field source.

According to various advantageous embodiments of the invention, the additional thickness is a radial additional thickness of the lever.

According to various advantageous embodiments of the invention, the vane comprises a chord, the length L of the lever being greater than or equal to half of the chord.

According to various advantageous embodiments of the invention, the magnetic field source is arranged in the plane of rotation of the lever.

According to various advantageous embodiments of the invention, the system comprises an elastic element configured to space the lever from the magnetic field source.

According to various advantageous embodiments of the invention, the system is adapted to power the magnetic field source electrically so as to move the lever progressively, in particular opposing the force exerted by the elastic element.

According to various advantageous embodiments of the invention, the support comprises a stop, the vane being movable in rotation between a first position against the stop and a second position against the magnetic field source, wherein the air gap can be closed when the vane is in the second position.

According to various advantageous embodiments of the invention, the vane comprises an airfoil intended to extend radially into a flow of the turbomachine from the support, the support separating the airfoil from the magnetic field source.

According to various advantageous embodiments of the invention, the system comprises a vane orientation sensor, the magnetic field source being controlled as a function of the orientation measured by the sensor.

According to various advantageous embodiments of the invention, the vane is a first vane, the lever is a first lever, the air gap is a first air gap; the control system also comprising a second vane which is movable in rotation relative to the support and which comprises a second lever for controlling the orientation of the second vane; the magnetic field source defining a second air gap with the second lever so as to drive the second lever in rotation.

According to various advantageous embodiments of the invention, the first vane comprises a first rotation axis, the second vane comprises a second rotation axis, the magnetic field source being arranged in a plane generated by the rotation axes.

According to various advantageous embodiments of the invention, the system comprises at least one annular row of identical variable orientation vanes; the first vane and the second vane belonging to the annular row, and each vane is movable in rotation relative to the support and comprises a control lever for controlling the orientation of the vane.

According to various advantageous embodiments of the invention, the system comprises at least two annular rows of variable orientation vanes; the first vane belonging to one of the two annular rows of vanes, and the second vane belonging to the other of the two annular rows of vanes.

According to various advantageous embodiments of the invention, the magnetic field source is arranged axially and/or circumferentially between the first vane and the second vane.

According to various advantageous embodiments of the invention, the control system is configured so as to be able to turn the or each vane through an angle greater than or equal to 5°, or 10°, or 20°, or 30°.

According to various advantageous embodiments of the invention, the or each magnetic field source is arranged at the radial level of the associated lever.

According to various advantageous embodiments of the invention, the or each magnetic field source is an electromagnet and/or the electric field source drives the associated lever by electromagnetic induction.

According to various advantageous embodiments of the invention, the vane comprises a control rod passing through the support, the rod being mounted pivoting relative to the support.

According to various advantageous embodiments of the invention, the first vane and the second vane form a pair of vanes, the row consists of identical pairs of vanes, or the vanes of one of the two rows are identical to the first vane and the vanes of the other of the two rows are identical to the second vane.

According to various advantageous embodiments of the invention, each row of vanes is formed from identical vanes or identical pairs of vanes.

According to various advantageous embodiments of the invention, the length L of the lever is greater than or equal to half the spacing between two adjacent vanes of a same row and/or two successive orientable rows.

According to various advantageous embodiments of the invention, the system comprises a permanent magnet configured to space the or each associated lever from the magnetic field source; the permanent magnet can form a stop for the associated vane or for each associated vane.

According to various advantageous embodiments of the invention, the magnetic field source is arranged radially level with the magnetic field source.

A further object of the invention is a system for controlling a variable orientation vane(s) of a turbomachine, the control system comprising: a support, in particular an annular casing; a vane that is movable in rotation relative to the support and that comprises a lever for controlling the orientation of the vane; distinguished in that it also comprises a magnetic field source arranged in the trajectory of the lever and/or in the space swept by the lever so as to drive the lever in rotation, in particular directly.

According to various advantageous embodiments of the invention, the or each lever is straight or bent; where applicable made of one piece.

The invention also concerns a turbomachine comprising a system for controlling a variable orientation vane, in various instances the system conforms to the invention, for example the turbomachine comprises a low-pressure compressor in which the system is installed.

According to various advantageous embodiments of the invention, the turbomachine comprises a rotor with at least one annular row of rotor vanes arranged axially at the level of the or at least one magnetic field source.

According to various advantageous embodiments of the invention, the turbomachine is an aircraft turbojet or turboprop engine, the system being configured so as to power the or each magnetic field source electrically on take-off of the aircraft.

In general, the advantageous embodiments of each object of the invention are also applicable to the other objects of the invention. As far as possible, each object of the invention can be combined with the other objects. The objects of the invention can also be combined with the embodiments of the description, which furthermore can be combined with each other.

The invention allows precise actuation of the orientable vanes. It reduces the number of movable interfaces, which extends the service life of the system despite the vibrations and temperature of the turbomachine. The extreme positions of each orientable vane are furthermore respected. In fact, each field source forms a stop face which the vane reaches in its second position. This precision is achieved in a simple and economic fashion.

The invention also allows the magnetic field sources to be shared. This synergy reduces the mass and allows a saving. The combination of springs and magnetic sources allows progressive control of the orientation of the vanes by progressive supply to the coils. In this way, each orientable vane can occupy a plurality of intermediate positions.

DRAWINGS

DETAILED DESCRIPTION

In the description below, the terms "internal" and "external" refer to a positioning relative to the rotation axis of an axial turbomachine. The axial direction corresponds to the direction along the rotation axis of the turbomachine. The radial direction is perpendicular to the rotation axis. "Upstream" and "downstream" refer to the main direction of the flow in the turbomachine.

Figure 1:
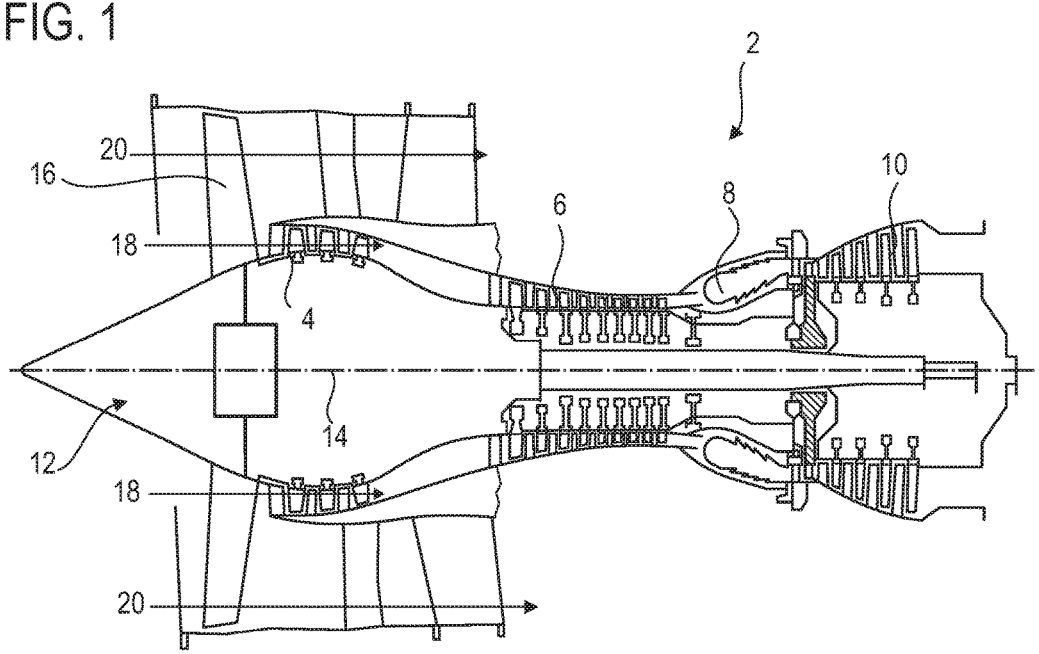
FIG. 1 depicts an axial turbomachine according to various embodiments of the invention.

FIG. 1 shows in simplified form an axial turbomachine. In this exemplary instance, it is a ducted fan turbojet engine. The turbojet engine 2 comprises a first compression level called the low-pressure compressor 4, a second compression level called the high-pressure compressor 6, a combustion chamber 8 and one or more levels of turbines 10. In operation, the mechanical power of the turbine 10 transmitted via the central shaft to the rotor 12 sets the two compressors 4 and 6 in motion. The latter comprise several rows of rotor vanes associated with rows of stator vanes. Rotation of the rotor around its rotation axis 14 thus allows an air flow to be generated and progressively compressed until it enters the combustion chamber 8.

An input fan 16, often also called a blower, is coupled to the rotor 12 and generates an air flow which divides into a primary flow 18 passing through the various above-mentioned levels of the turbomachine, and a secondary flow 20 passing through an annular duct (partially shown), generating a thrust useful for propulsion of an aircraft.

Figure 2:
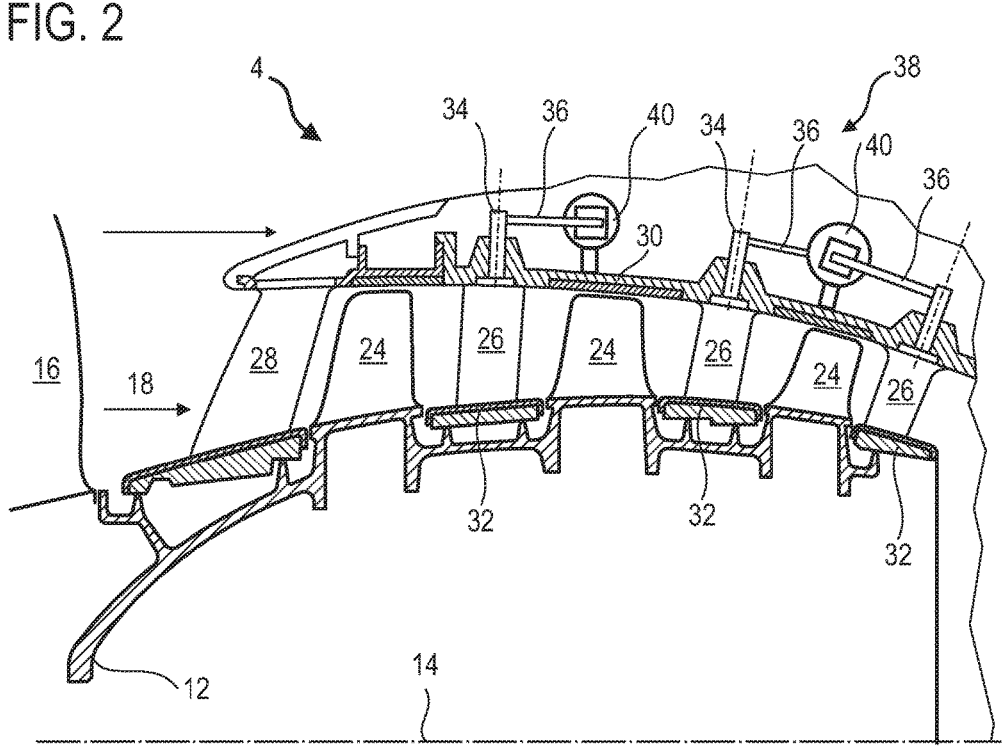
FIG. 2 is a diagram of a compressor of the turbomachine according to various embodiments of the invention.

FIG. 2 is a cross-sectional view of a compressor of an axial turbomachine as shown in FIG. 1. The compressor can be a low-pressure compressor 4.

The rotor 12 comprises several rows of rotor vanes 24, in this exemplary instance three. The inclination of the chords of the rotor vanes 24 remains constant relative to the rotation axis 14. The low-pressure compressor 4 comprises several rectifiers, in this exemplary instance four, which each contain a row of stator vanes 26 and 28 in the sense that they are connected to the stator. The rectifiers are associated with the fan 16 or with a row of rotor vanes to straighten the air flows so as to convert the flow speed into static pressure. Each rotor or stator vane has a leading edge, a trailing edge, a front surface and a back surface; the surfaces connect the leading edge to the trailing edge, in the same way as the chords of the vane. In the description below, reference can be made to a median chord. The front surface and back surface delimit the airfoil of the corresponding vane.

The stator vanes 26 and 28 extend substantially radially from an outer housing 30. The stator vanes 26 and 28 comprise inlet vanes 28 with fixed orientation and downstream vanes 26 with adjustable orientation. These vanes 26 are also known as variable stator vanes (VSV). In various embodiments the inclination of their chords can vary relative to the rotation axis 14 of the compressor 4. Their front and rear faces can be exposed to varying degrees to the primary flow 18. The orientable vanes 26 of a first row can be identical. In this exemplary instance, there are three rows of orientable vanes 26. However, it would be possible to install further rows, for example by making the inlet vanes orientable. Or again, the compressor can comprise merely a single orientable row.

The orientable vanes 26 can pivot relative to the flow 18 such that their airfoils cover a varying proportion of the fluid flow. They can intercept the primary flow 18 to a greater extent. The circumferential width they occupy can vary. The leading edges and the trailing edges can move closer to or further away from the vanes of the same row. By being inclined to a varying extent relative to the general flow direction, they deflect the primary flow 18 to a greater or lesser extent in order to modulate the resulting flow rectification. Thus, the turbomachine and the compressor can be following different efficiency curves during operation.

The compressor 4 can comprise internal shrouds 32 suspended at the inner ends of the orientable vanes 26. In order to allow their rotation, they have ends with pivot or ball connections (not shown). Thus, the orientable vanes 26 can also be inclined relative to the internal shrouds 32.

The orientable vanes 26 carried by the casing 30 via the control rods 34 form rotatable connections. Levers 36 at the tips of the rods 34 allow a rotation to be transferred to the orientable vanes 26. The angular orientations of the orientable vanes 26 are controlled by a control system 38 cooperating with the levers 36.

The control system 38 comprises at least one magnetic field source 40, in some exemplary instances several magnetic field sources 40 forming mechanical actuators. Each source 40 can be fixed to the outer surface of the casing 30, which reduces the space required. The control system 38 can comprise a magnetic field source 40 for each orientable vane, or one magnetic field source 40 for two orientable vanes 26. Each source 40 acts magnetically on one or more levers 36 by attraction or repulsion. This movement causes a rotation of the lever 36 concerned and hence a change in angular orientation of the corresponding orientable vane 26.

Figure 3:
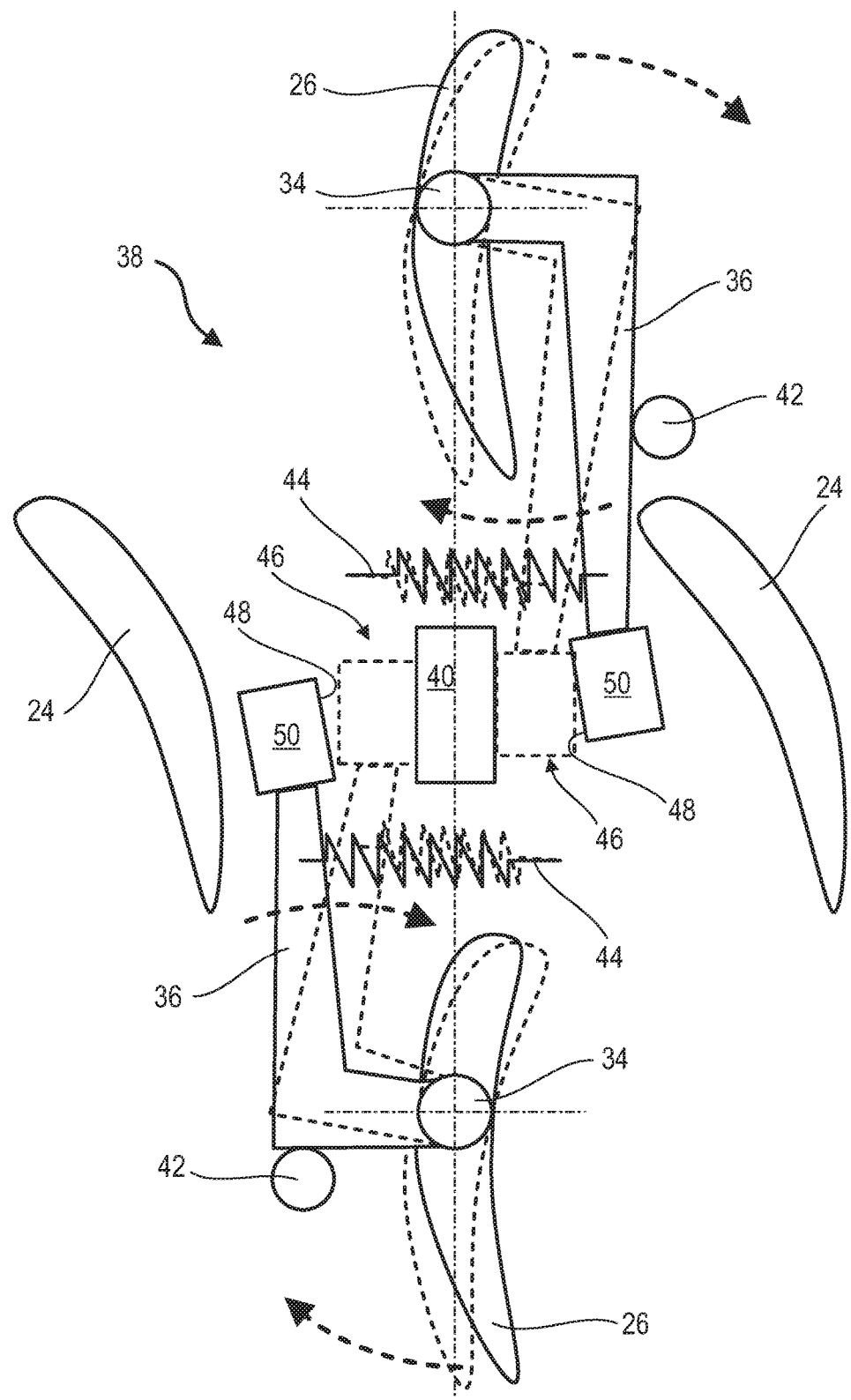
FIG. 3 illustrates a control system according to various first exemplary embodiments of the invention.

FIG. 3 depicts a part of the control system 38 of FIG. 2. A row of rotor vanes 24 is represented by two vanes 24. The casing is not shown for reasons of clarity. Only two rows of orientable vanes 26 are shown for reasons of clarity. The operation of the row not shown can easily be deduced from the description below.

The orientable vanes 26 are each movable in rotation between a first position called the rest position (drawn in solid lines), and a second position called the active position (drawn in dotted lines). They pivot on themselves due to their control rods 34. In the first position, the orientable vanes 26 can rest against angular stops 42, for example formed on the casing. They can be held there thanks to elastic elements 44 such as springs, such that they can be auto-stable.

The levers 36 can be generally parallel to the chords of the orientable vanes 26. In the first position, the levers 36 provide air gaps 46 with the source 40. In particular, the levers 36 have faces 48 facing the source 40, the faces 48 delimiting the air gaps 46. These faces 48 can be formed on additional thicknesses 50 of the levers 36. The additional thicknesses 50 increase the useful surface area of the air gaps 46, which increases the efficiency of the system. When the source 40 is electrically powered, the magnetic field produced in the air gaps 46 attracts the levers 36 such that the air gaps 36 close, and the faces 48 come into contact and hence rest against the source 40. The orientable vanes 26 thus come to stop against the sources 40.

Each magnetic field source 40 can comprise an induction coil and optionally a ferromagnetic core inside the coil. This increases the magnetic field applied to the levers 36. When the magnetic field source 40 is electrically powered, it produces a field which attracts the two levers 36, causing the orientable vanes 26 to turn in the same direction.

In order to improve this phenomenon, each lever 36 can comprise a magnetic material. It can comprise a permanent magnet, a rare earth, a ferromagnetic material, steel and/or an organic material. The material can form each lever 36 integrally, or substantially the additional thicknesses 50.

It can be useful to orient the orientable vanes 26 into their first position on take-off of an aircraft by powering the sources 40, then to cut their power supply during cruising flight; this optimises the general consumption of the turbojet engine.

In the present embodiment, the source 40 can control two orientable vanes 26. To do this, the source 40 is placed at the axial level of a row of rotor vanes 24, which allows a radially compact installation.

Figure 4:
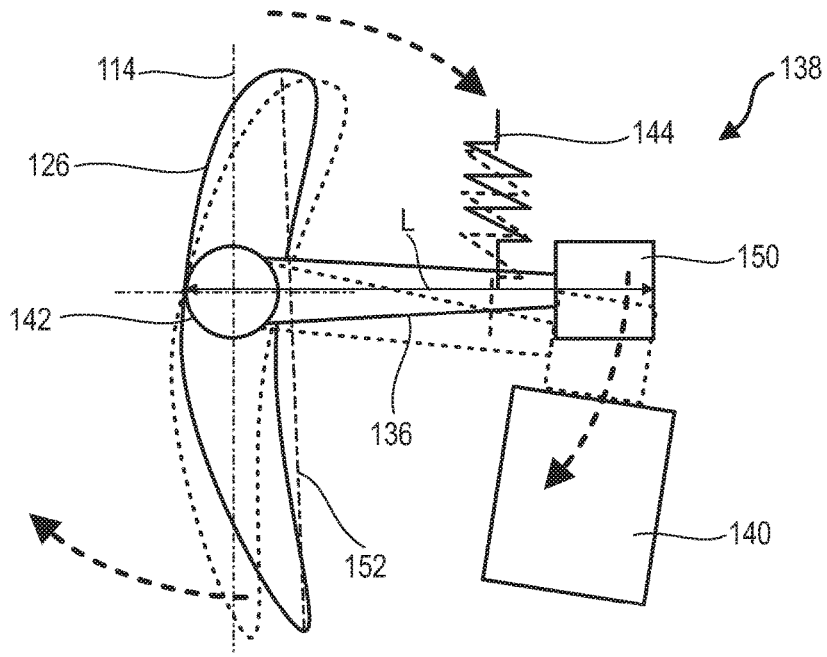
FIG. 4 illustrates a control system according to various second exemplary embodiments of the invention.

FIG. 4 shows the control system 138 according to various second exemplary embodiments of the invention. This FIG. 4 repeats the numbering of the previous figures for identical or similar elements, the numbering being however incremented by 100. Specific numbers are added for this embodiment.

The control system 138 of these second exemplary embodiments is substantially identical to the first exemplary embodiments, but differs in that each orientable vane 126 is equipped with a dedicated magnetic field source 140 for each of the vanes of the corresponding row. This allows independent control of each orientable vane 126. The system 138 comprises an orientable vane 126 with a lever 136 transversely to its chord 152. The lever 136 can be perpendicular to the chord 152.

The length L of the lever 136 can represent the majority of the length of the chord 152. The length L of the lever 136 can be measured from the end of the additional thickness 150 to the opposite end of the rod 134. The source 140 can be placed axially at the level of the associated orientable vane 126. The elastic element 144 is generally parallel to the rotation axis 114.

Figure 5:
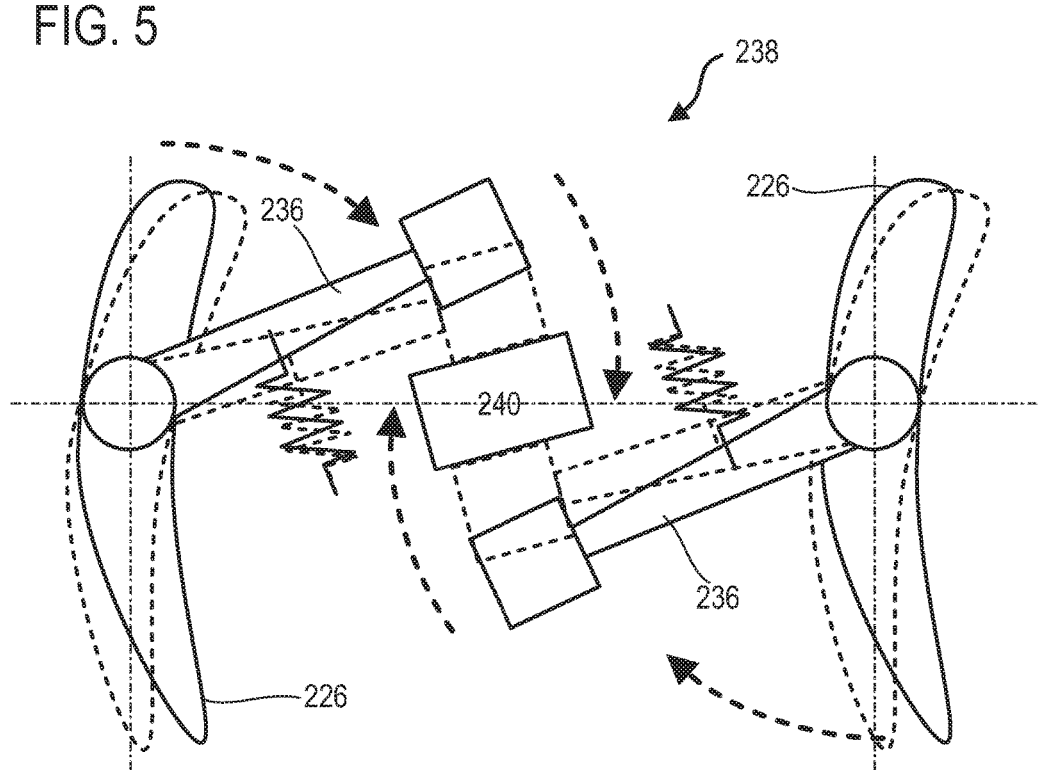
FIG. 5 illustrates a control system according to various third exemplary embodiments of the invention.

FIG. 5 shows the control system 238 according to various third embodiments of the invention. This FIG. 5 repeats the numbering of the previous figures for identical or similar elements, the numbering being however incremented by 200.

The control system 238 of these third exemplary embodiments is substantially identical to the first exemplary embodiments. Nonetheless, it differs in that the source powers two orientable vanes 226 of the same annular row of vanes. The two orientable vanes 226 receive between them a common magnetic field source 240. This source 240 is placed axially at the level of the orientable vanes 226. The levers 236 extend transversely relative to the chords of the orientable vanes 226. The levers 236 extend towards the other orientable vane 226 of the respective pair.

The present configuration offers axial compactness. It frees space at the level of the rotor vanes. The presence of annular fixing flanges is not hindered. The sharing of a same magnetic field source allows a reduction in the total number of sources and simplifies the control system.

According to various alternative embodiments of the invention, one source can control four orientable vanes, for example two vanes of a first row and two vanes of a second row. These vanes describe a quadrilateral, the center of which receives the source. This alternative can be achieved by combining the first exemplary embodiments of FIG. 3 with the third exemplary embodiments of FIG. 5. The person skilled in the art is encouraged to share each magnetic field source further.

Figure 6:
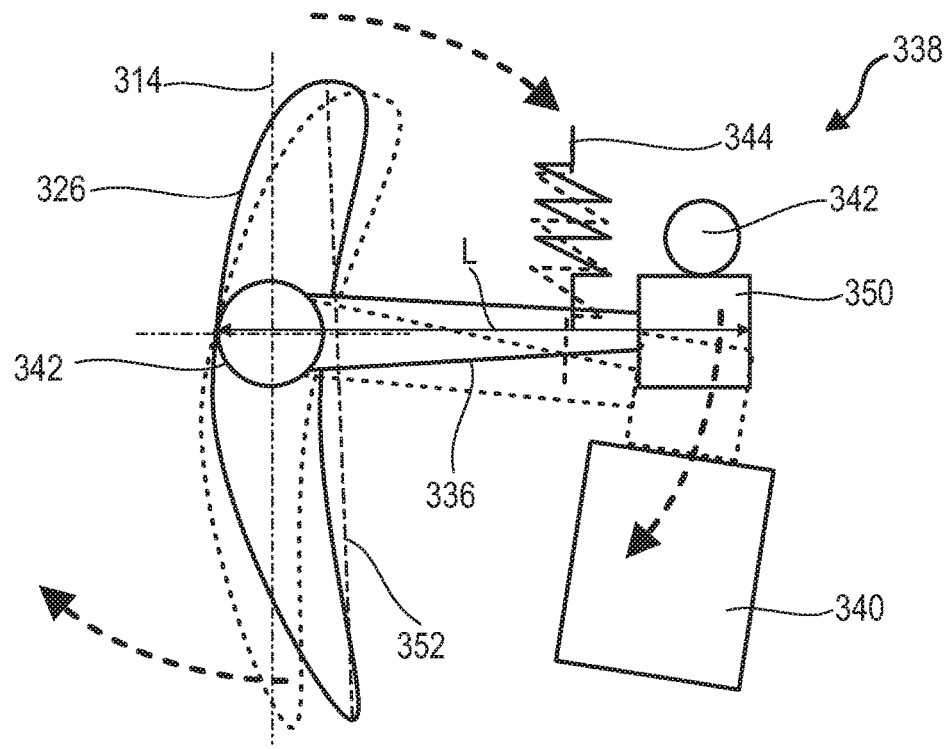
FIG. 6 illustrates a control system according to various fourth exemplary embodiments of the invention.

FIG. 6 shows the control system 338 according to various fourth embodiments of the invention. This FIG. 6 repeats the numbering of the previous figures for identical or similar elements, the numbering being however incremented by 300.

The control system 338 of the fourth exemplary embodiments of the invention is similar to that of the second exemplary embodiments. Nonetheless it is distinguished in that a stop 342 is added to the control system 338. This stop 342 could cooperate with the lever 336, in particular with the additional thicknesses 350. It can be that the stop is a permanent magnet. When the lever 336 and/or the additional thickness 350 comprise a ferromagnetic material, this magnet holds the vane 326 in its first position. When the source 340 is powered, it overcomes the holding force of the magnet and attracts the vane 326 into its second position.

The control system 338 of the fourth exemplary embodiments is substantially identical to the first exemplary embodiments, but differs however in that each orientable vane 326 is equipped with a dedicated magnetic field source 340 for each of the vanes of the corresponding row. This allows independent control of each orientable vane 326. The system 338 comprises an orientable vane 326 with a lever 336 transversely to its chord 352. The lever 336 can be perpendicular to the chord 352.

The length L of the lever 336 can represent the majority of the length of the chord 352. The length L of the lever 336 can be measured from the end of the additional thickness 350 to the opposite end of the rod 334. The source 340 can be placed axially at the level of the associated orientable vane 326. The elastic element 344 is generally parallel to the rotation axis 314.

In general, a permanent magnet, which can form a stop, can be provided for each vane according to each of the embodiments of the invention. It is possible that a same magnet can serve as a stop for two adjacent vanes. Each spring can be replaced by a magnet. Each spring can be configured to work in compression or in traction.

The invention claimed is:

1. A control system for a variable orientation stator vane of a gas turbine engine, said control system comprising:
   a support;
   a vane that is pivotally linked to the support and that comprises a control lever for controlling the orientation of the vane;
   an actuator with a magnetic field source that defines an air gap with the control lever so as to be able to drive the control lever in rotation; and
   an elastic element configured to pull away the control lever from the magnetic field source so as to open the air gap.

2. The control system according to claim 1, wherein the magnetic field source comprises a coil and a ferromagnetic core inside the coil.

3. The control system according to claim 1, wherein the control lever comprises a portion of ferromagnetic material cooperating with the magnetic field source.

4. The control system according to claim 1, wherein the control lever comprises a portion with an increased thickness cooperating with the magnetic field source.

5. The control system according to claim 4, wherein the portion is a radially thickened portion, the control lever includes a main elongation, and the radially thickened portion is formed at an end of the control lever with respect to its main elongation.

6. The control system according to claim 1, wherein the vane comprises a chord, a length L of the control lever being greater than or equal to half of the chord.

7. The control system according to claim 1, wherein the magnetic field source is arranged in a plane of rotation of the control lever.

8. The control system according to claim 1 further comprising a permanent magnet functionally and structurally configured to space the control lever away from the magnetic field source, wherein the permanent magnet forms a first stop and the magnetic field source forms a second stop, the control lever being functionally and structurally configured to rotate from the first stop to the second stop.

9. The control system according to claim 1, wherein the control system is functionally and structurally adapted to power the magnetic field source electrically so as to move the control lever progressively, and so as to overcome an opposing force exerted by the elastic element.

10. The control system according to claim 1, wherein the support comprises a stop, the vane being movable in rotation between a first position against the stop and a second position against the magnetic field source, wherein the air gap can be closed when the vane is in the second position.

11. The control system according to claim 1, wherein the vane comprises an airfoil that extends radially into a flow of a turbomachine from the support, the support separating the airfoil from the magnetic field source.

12. The control system according to claim 1 further comprising a vane orientation sensor, the magnetic field source being controlled as a function of an orientation measured by the orientation sensor.

13. The control system according to claim 1, wherein the vane is a first vane, the control lever is a first control lever, the air gap is a first air gap; the control system further comprising a second vane that is movable in rotation relative to the support and that comprises a second control lever for controlling the orientation of the second vane; the magnetic field source defining a second air gap with the second control lever so as to drive the second control lever in rotation.

14. The control system according to claim 13, wherein the first vane comprises a first rotation axis, the second vane comprises a second rotation axis, the magnetic field source being arranged in a plane generated by the first rotation axis and by the second rotation axis.

15. The control system according to claim 13 further comprising at least two annular rows of vanes, the first vane belonging to one of the two annular rows of vanes, and the second vane belonging to the other of the two annular rows of vanes.

16. The control system according to claim 13, wherein the magnetic field source is arranged at least one of axially and circumferentially between the first vane and the second vane.

17. A control system for a variable stator vane of a gas turbine engine, said control system comprising:
a support with a first stop surface;
a vane that is movable in rotation relative to the support and that comprises a control lever for controlling the orientation of the vane;
an actuator with a magnetic field source that includes a second stop surface defining an air gap with the control lever so as to be able to drive the control lever in rotation;
wherein the lever includes two opposite surfaces functionally and structurally adapted for engaging the first stop surface and the second stop surface.

18. A gas turbine engine, said gas turbine engine comprising a compressor with a support and a control system, the control system comprising:
a magnetic field source; and
at least two annular rows of vanes, the annular rows being axially spaced one from another, each of the annular rows including:
a vane that is movable in rotation relative to the support and that comprises a control lever for setting the orientation of the corresponding vane, the control lever defining an air gap with the magnetic field source so as to rotate the corresponding vane.

19. The gas turbine engine according to claim 18 further comprising a rotor with at least one annular row of rotor vanes arranged axially level with the magnetic field source.

20. The gas turbine engine according to claim 18, wherein the gas turbine engine comprises one of a aircraft turbojet and a turboprop engine, the control system being structurally and functionally configured so as to power the magnetic field source electrically on take-off of the aircraft.

* * * * *